United States Patent [19]
Uchida et al.

[11] Patent Number: 5,798,867
[45] Date of Patent: Aug. 25, 1998

[54] LASER BEAM-SPLITTING APPARATUS

[75] Inventors: Takahiro Uchida; Shin-ichi Nakayama, both of Chiba-ken, Japan

[73] Assignee: Miyachi Technos Corporation, Noda, Japan

[21] Appl. No.: 796,391

[22] Filed: Feb. 4, 1997

[51] Int. Cl.$^6$ .............................. G02B 27/14; G02B 7/02
[52] U.S. Cl. .......................... 359/629; 359/618; 359/822
[58] Field of Search .................................. 359/629, 618, 359/813, 819, 822; 372/6

[56] References Cited

U.S. PATENT DOCUMENTS

| | | | |
|---|---|---|---|
| 3,986,130 | 10/1976 | Sources et al. | 359/629 |
| 4,060,769 | 11/1977 | Mallozzi et al. | 359/629 |
| 4,328,464 | 5/1982 | Pivirotto | 359/342 |
| 4,576,436 | 3/1986 | Daniel | 385/25 |
| 4,659,185 | 4/1987 | Aughton | 359/629 |
| 5,048,946 | 9/1991 | Sklar et al. | 351/206 |
| 5,325,381 | 6/1994 | Paoli | 372/24 |
| 5,515,194 | 5/1996 | Kanterakis et al. | 359/127 |
| 5,517,768 | 5/1996 | Aviv | 34/255 |

*Primary Examiner*—Georgia Y. Epps
*Assistant Examiner*—Ricky Mack
*Attorney, Agent, or Firm*—Wenderoth, Lind & Ponack, L.L.P.

[57] ABSTRACT

A laser beam-splitting apparatus that is capable of producing a plurality of split laser beams having a uniform laser output as well as easily and precisely adjusting the laser output of the individual split laser beams to any desired value. The apparatus is provided with one or a plurality of partial reflection and transmission mirrors each having a reflectance and transmittance which spatially and continuously varies in one-dimensional or two-dimensional directions for the wave length of the primary laser beam. The reflectance and transmittance of each mirror for the laser beam incident thereon can be adjusted to a desired value by an adjusting device which is adapted to the position of the mirror. The laser beams reflected or transmitted from the reflection and transmission mirrors are output as the split laser beams respectively.

9 Claims, 6 Drawing Sheets

1

LASER BEAM-SPLITTING APPARATUS

BACKGROUND OF THE INVENTION

The present invention relates to a laser beam-splitting apparatus that simultaneously splits a primary laser beam into a plurality of split laser beams.

A laser beam-splitting apparatus is used in, for example, a multi-position processing system for laser welding to split a primary laser beam from a laser oscillator into a plurality of split laser beams which are directed to different processing positions.

FIG. 8 shows a multi-position processing system for laser welding in which a plurality of, say, four laser beam output units 102A–102D are connected to a main unit of laser aparatus 100 via optical fibers 104A to 104D, respectively.

The main unit 100 incorporates therein a laser oscillator to produce a primary laser beam, a laser beam-splitting apparatus to split the primary laser beam into four split laser beams and laser beam input means to project the split laser beams upon one ends of the optical fibers 104A to 104D.

After passing through the optical fibers 104A to 104D, the split laser beams are received by the laser beam output units 102A to 102D, respectively, which in turn condense and output the split laser beams to the corresponding workpieces W to be welded, respectively.

Such a multi-position processing system requires only one main unit 100 to weld at the same time a plurality of (four in the example shown) workpieces W, and is thus capable of yielding higher productivity.

FIG. 9 shows a principal arrangement of a prior art laser beam-splitting apparatus which is adapted for four power-sharing deliveries in a multi-position processing system as described above. The laser beam-splitting apparatus is comprised of three pieces of partial reflection and transmission mirrors 106A, 106B, and 106C, and a piece of total reflection mirror 106D. The mirrors 106A to 106D are disposed in order on the optical axis of a primary laser beam from a laser oscillator (not shown) and are inclined at a fixed angle, say, 45 degrees, respectively.

The first stage of partial reflection and transmission mirror 106A, upon which the primary laser beam $LB_0$ is projected, has a reflectance of about 25% and a transmittance of about 75%. The second partial reflection and transmission mirror 106B has a reflectance of about 33% and a transmittance of about 67%. The third partial reflection and transmission mirror 106C has a reflectance of about 50% and a transmittance of about 50%. The total reflection mirror 106D has a reflectance of about 100% and a transmittance of about 0%.

The first partial reflection and transmission mirror 106A reflects about 25% of the primary laser beam $LB_0$ (or about 0.25 $LB_0$) and at the same time transmits the remaining part or about 75% of the primary laser beam $LB_0$ (or about 0.75 $LB_0$).

The second partial reflection and transmission mirror 106B reflects about 33% of the laser beam transmitted from the first mirror 106A (or about 0.25 $LB_0$) while transmitting the remaining part or about 67% of the incident laser beam (or about 0.50 $LB_0$).

The third partial reflection and transmission mirror 106C reflects about 50% of the transmitted laser beam from the second mirror 106B (or about 0.25 $LB_0$) while transmitting the remaining part or about 50% of the incident laser beam (or about 0.25 $LB_0$).

The laser beam transmitted from the third mirror 106C is directed to the total reflection mirror 106D which reflects the whole of the laser beam incident thereon (or about 0.25 $LB_0$).

Thus, four reflected laser beams having approximately equal laser outputs are obtained as split laser beams LB(A), LB(B), LB(C) and LB(D) from the four mirrors 106A, 106B, 106C and 106D, respectively.

FIG. 10 shows another prior art laser beam-splitting apparatus. The apparatus comprises three pieces of partial reflection and transmission mirrors 108A, 108A', and 108C', and three pieces of total reflection mirrors 108B, 108C and 108D. Those mirrors are disposed, as shown, in right-angled zigzags with respect to the optical axis of the primary laser beam $LB_0$. Each of the partial reflection and transmission mirrors 108A, 108A' and 108C' has a reflectance of about 50% and a transmittance of about 50%.

In this laser beam-splitting apparatus, the primary laser beam $LB_0$ is projected upon the partial reflection and transmission mirror 108A which reflects about 50% of the primary laser beam $LB_0$ (or about 0.50 $LB_0$) while transmitting the remaining part or about 50% of the primary laser beam $LB_0$ (or about 0.50 $LB_0$).

The laser beam refelected from the mirror 108A (about 0.50 $LB_0$) is then directed to the partial reflection and transmission mirror 108A' which in turn reflects about 50% of the laser beam incident thereon (or about 0.25 $LB_0$) while transmitting the remaining part or about 50% of the incident laser beam (or about 0.25 $LB_0$). The reflected laser beam (about 0.25 $LB_0$) from the mirror 108A' is to the total reflection mirror 108B which in turn reflects the whole of the laser beam incident thereon.

The laser beam (about 0.50 $LB_0$) transmitted from the mirror 108A is directed via the total reflection mirror 108C to the partial reflection and transmission mirror 108C' which in turn reflects about 50% of the laser beam incident thereon (or about 0.25 $LB_0$) while transmitting the remaining part or about 50% of the incident laser beam (or about 0.25 $LB_0$). The reflected laser beam (about 0.25 $LB_0$) from the mirror 108C' is to the total reflection mirror 108D which reflects the whole of the laser beam incident thereon.

Thus, four reflected or transmitted laser beams having approximately equal laser outputs are produced as split laser beams LB(A), LB(B), LB(C) and LB(D) from the mirrors 108A', 108B, 108C' and 108D, respectively.

Practically such partial reflection and transmission mirrors are liable to have variations in its reflectance and transmittance so as to cause a difference of the component of polarization of laser beam between the reflected light and the transmitted light.

With the prior art laser beam-splitting apparatus, it is therefore difficult to split the primary laser beam $LB_0$ into precisely equal beams. Also, the laser outputs of the obtained split laser beams LB(A) to LB(D) are likely to be unequal, thus resulting in lower processing quality in the power-sharing deliveries of the simultaneous multi-position processing system.

In this regard, the prior art has taken measures of selecting the one having the lowest laser outputs among the split laser beams LB(A) to LB(D) as a reference and attenuating the laser outputs of the other split laser beams by means of attenuators so as to make them equal to the reference laser output.

For instance, in the prior art apparatus of FIG. 9, when the split laser beam LB(A) obtained from the mirror 106A has the lowest laser output (say 0.22 $LB_0$), attenuators 110 as shown by dotted lines are disposed on the optical axes of the other split laser beams LB(B), LB(C) and LB(D) from the mirrors 106B, 106C and 106D to attenuate the respective laser outputs to the value of the reference (0.22 $LB_0$).

3

In the prior art apparatus of FIG. 10, when for example the split laser beam LB(C) obtained from the mirror 108C' has the lowest laser output (say 0.22 $LB_0$), attenuators 110 as shown by dotted lines are disposed on the optical axes of the other split laser beams LB(A), LB(B) and LB(D) obtained from the mirrors 108A', 108B and 108D to attenuate the respective laser output to the value of the reference (0.22 $LB_0$).

However, attenuator 110 wastes the laser power of the laser beam LB and therefore reduces the energy efficiency. Furthermore the factor of attenuation in attenuator 110 can be changed only stepwise in proportion to the number of sheets of attenuation plates provided therein and so it is difficult to finely adjust the laser output of the laser beam. In addition, the profile of a laser beam is influenced by the surface property of an attenuator. To reduce such influence, improving the surface property of the attenuator involves higher costs. Besides, combining a plurality of attenuation plates in an attenuator may cause an interference of light, thus lowering the profile of the laser beam.

SUMMARY OF THE INVENTION

It is therefore an object of the invention to provide a laser beam-splitting apparatus capable of producing a plurality of split laser beams having uniform laser outputs.

It is another object of the invention to provide a laser beam-splitting apparatus capable of easily adjusting the laser output of individual split laser beams to a desired value.

It is a further object of the invention to provide a laser beam-splitting apparatus that assures uniformity of profile of a laser beam in split laser beams.

It is still another object of the invention to provide a laser beam-splitting apparatus with a reduced cost and simpler construction which does not require an attenuation plate.

It is a still further object of the invention to provide a multi-position processing system that assures a uniform processing quality.

In accordance with an aspect of the invention, there is provided a laser beam-splitting apparatus for producing a plurality of split laser beams from a primary laser beam which comprises one or a plurality of partial reflection and transmission mirrors. Each partial reflection and transmission mirror has a reflectance and transmittance spatially and continuosly varying within a predetermined range in one-dimensional or two-dimensional directions for the wave length of the primary laser beam and is disposed at a predetermined position on the optical axis of the laser beam. The laser beams reflected or transmitted from the reflection and transmission mirrors are output as the split laser beams, respectively. Also, adjusting means is provided to adjust the position of each of the partial reflection and transmission mirrors for adjusting the reflectance and transmittance of the mirror with respect to the laser beam incident thereon.

With this arrangement, adjusting the position of each partial reflection and transmission mirror by the adjusting means permits the reflectance and transmittance of the mirror to be adjusted to any desired value and thereby it can be achieved with less loss of laser power to compensate variations in the reflection and transmission properties of the mirror, to precisely split the primary laser beam into equal parts and to finely adjust the laser output of the individual laser beams to any desired value. Also, the laser beam-splitting apparatus of the invention can be comprised of the same type or structure of partial reflection and transmission mirrors and it is thus advantageous in assembling, stock management, maintenance and so on.

4

BRIEF DESCRIPTION OF THE DRAWINGS

The above and other objects and advantages of the invention will become more apparent from the following description taken in conjunction with the drawings in which.

DETAILED DESCRIPTION OF PREFERRED EMBODIMENTS

Embodiments of the invention will be described with reference to FIG. 1 to FIG. 7.

Figure 1:
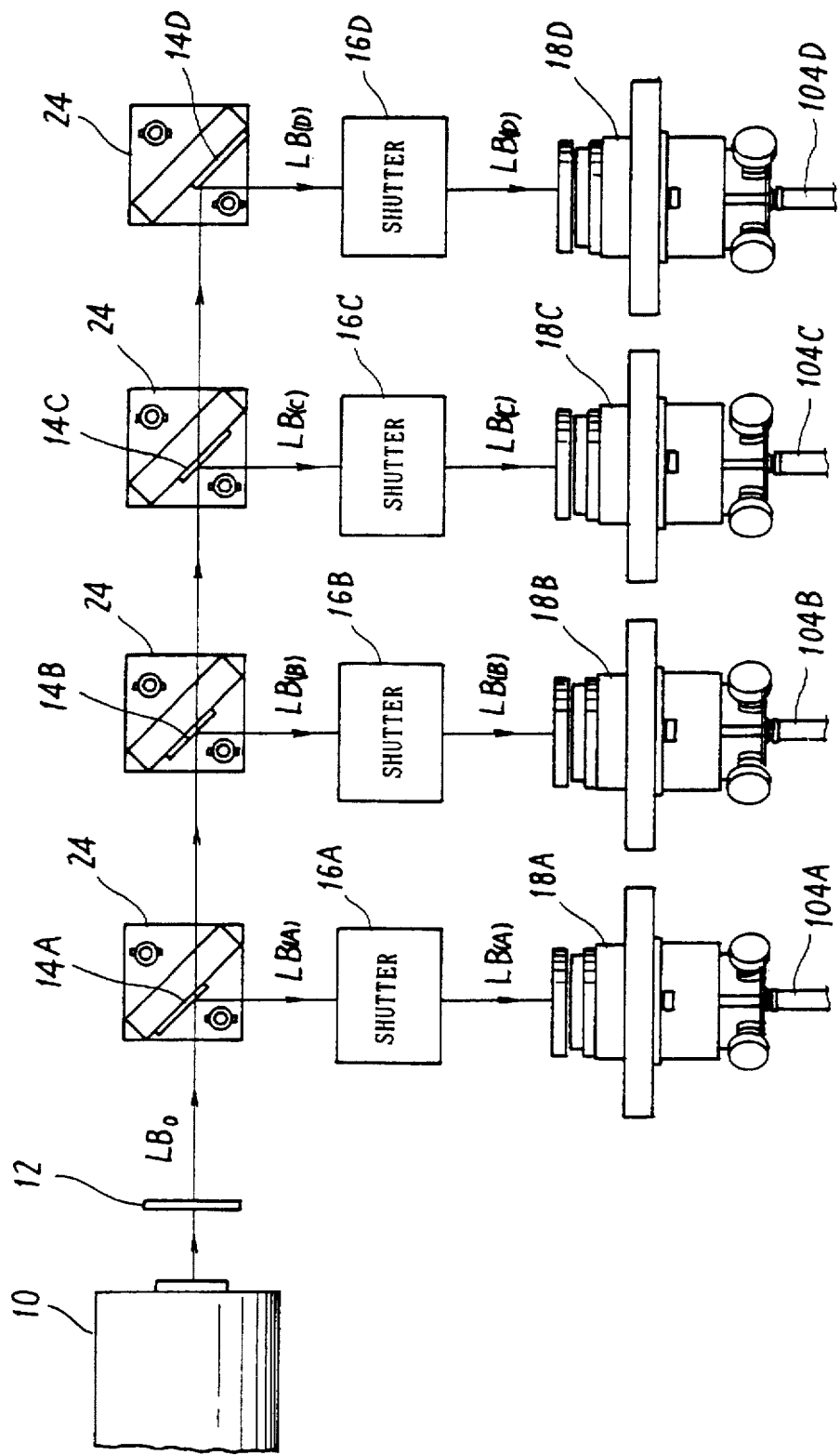
FIG. 1 is a perspective view showing an arrangement of a laser beam-splitting apparatus according to a preferred embodiment of the present invention.
Figure 8:
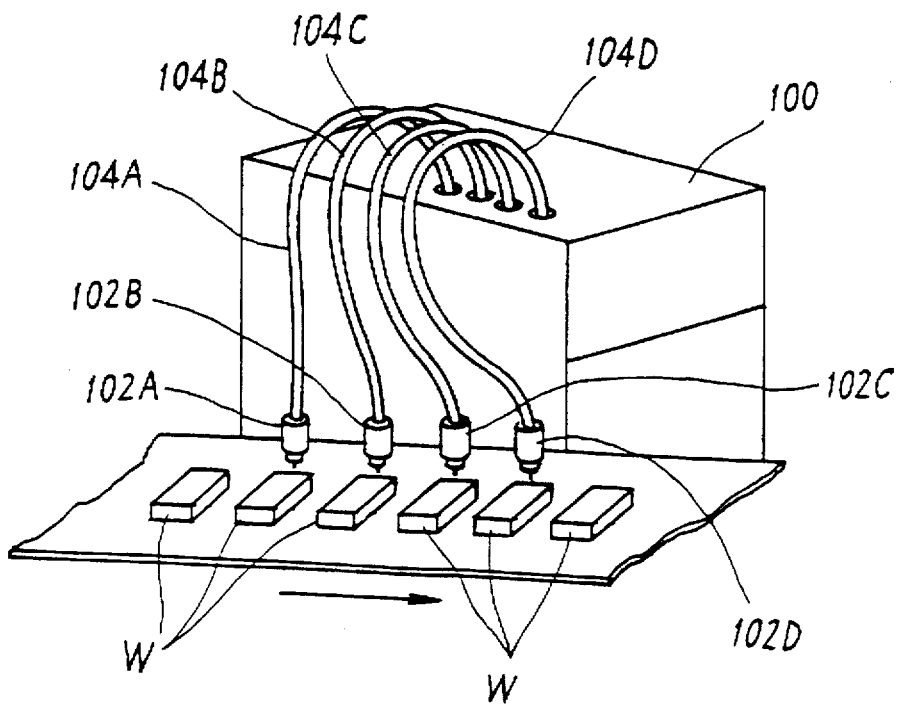
FIG. 8 is a perspective view of a multi-point processing system for laser welding.

Referring to FIG. 1, there is shown an arrangement of one embodiment of a laser beam-splitting apparatus in accordance with the invention. The laser beam-splitting apparatus can be used, for instance, in the multi-position processing system for laser welding of FIG. 8.

In FIG. 1, a laser oscillator 10 includes a laser medium such as YAG (Yttrium-Alminium-Garnet) rod that emits light from its opposite faces. The light from the laser medium repeats reflections between a pair of optical resonator mirrors 12 (only one shown) and is thus amplified. The amplified light outputs as a primary laser beam $LB_0$ from the resonator mirror 12.

In this embodiment, a plurality of, say, four pieces of partial reflection and transmission mirrors 14A, 14B, 14C and 14D are disposed at predetermined positions in regular intervals on the optical axis of the primary laser beam $LB_0$. Each of the mirrors 14A, 14B, 14C and 14D is inclined at a fixed angle, for example, 45 degrees with respect to the axis of the primary laser beam $LB_0$.

Disposed opposite to the mirrors 14A, 14B, 14C and 14D are shutters 16A, 16B, 16C and 16D and laser beam input units 18A, 18B, 18C and 18D behind the shutters, to which optical fibers 104A, 104B, 104C and 104D are connected, respectively.

Figure 2:
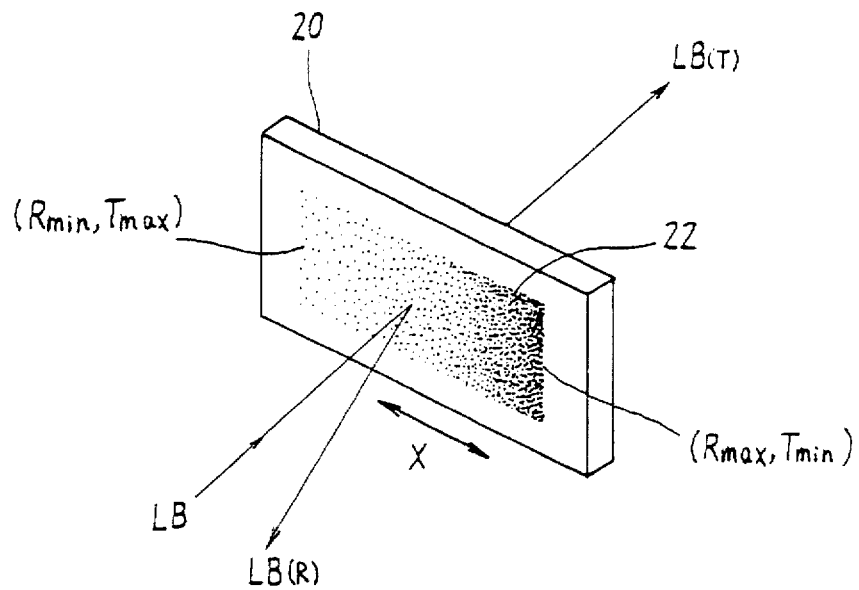
FIG. 2 is a perspective view of a partial reflection and transmission mirror in the embodiment of the invention; shown in FIG. 1

As schematically shown in FIG. 2, each of the partial reflection and transmission mirrors 14A to 14D is comprised of a mirror plate 20 made of a transparent material having transmittance of approximately 100%, such as glass, quartz or the like. The mirror plate 20 has its surface or reverse coated with a partial reflection and transmission multilayer film 22 with a reflectance (R) and transmittance (T) spatially and continuously varying in the lengthwise direction of the mirror as indicated by the arrow X within the range of (Rmax, Tmin) to (Rmin, Tmax) for the wave length of YAG laser beam.

In this embodiment, one limit (Rmax, Tmin) may be selected to (100%, 0%) whereas the other limit (Rmin, Tmax) to (0%, 100%). Thus, a mirror 14 can play the roles of such a total reflection mirror as to reflect approximately 100% of YAG laser beam incident thereon and of such a total transmission mirror to transmit approximately 100% of the whole of YAG laser beam incident thereon as well as a strictly partial reflection and transmission mirror having any desired reflectance and transmittance (R, T) between those of a total reflection mirror and those of a total transmission mirror in accordance with the incident position of the YAG laser beam on the mirror 14.

Thus, the ratios of the reflected light LB(R) and the transmitted light LB(T) obtained from each partial reflection and transmission mirror 14 can be variably adjusted within the range of (100%, 0%) to (0%, 100%) by shifting the position of YAG laser beam incident thereon in the lengthwise direction of the mirror plate as shown in the arrow X.

Figure 3:
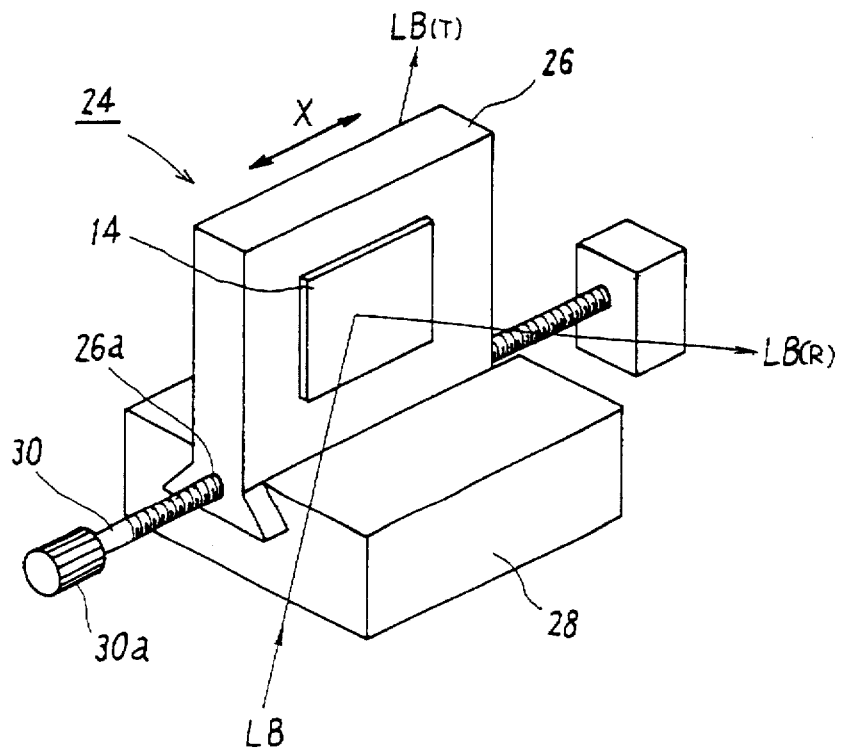
FIG. 3 is a perspective view of an adjusting means for adjusting the reflectance and transmittance of each partial reflection and transmission mirror in accordance with the embodiment.
Figure 4:
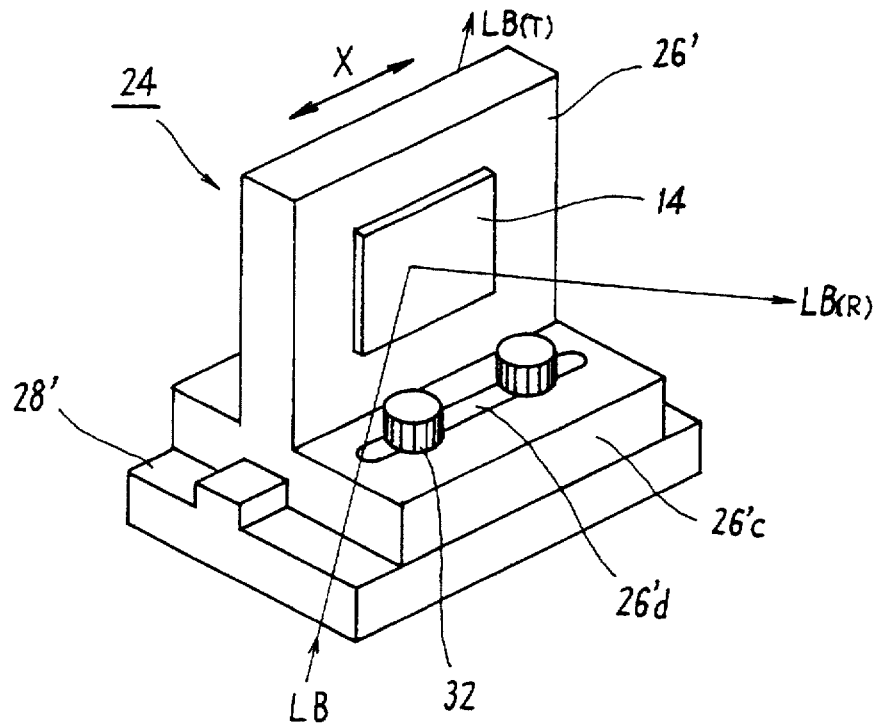
FIG. 4 is a perspective view of a modified adjusting means in accordance with the embodiment of the invention; shown in FIG. 1

FIGS. 3 and 4 show two different constructions of an adjusting means 24 for variably adjusting the reflectance and transmittance (R, T) of each partial reflection and transmission mirror 14.

In the mechanism of FIG. 3, a vertical support plate 26 that vertically supports the partial reflection and transmission mirror 14 is mounted on a horizontal base plate 28 so as to be slidable in a horizontal direction as shown by the arrow X and is provided with an internal threaded opening 26a and a ballscrew 30 penetrating therethrough. Turning a knob 30a of the ballscrew 30 causes the vertical support plate 26 and the mirror 14 to minutely shift their positions in the direction of the arrow X.

In the structure of FIG. 4, a vertical support plate 26' with a T-shaped cross-section is screwed to a horizontal base plate 28' by bolts 32 passing through an opening or slit 26'd that is formed on the horizontal lower portion of the vertical support plate 26' and that extends in the direction as shown by the arrow X. By loosening the bolts 32, it is permitted to minutely move by hand the position of the mirror 14 and the vertical support plate 26' on the horizontal base plate 28' in the direction of the arrow X.

Referring again to FIG. 1, in order to simultaneously produce four split laser beams in the present laser beam-splitting apparatus, the reflectance and transmittance of the partial reflection and transmission mirrors 14A to 14D may be set and adjusted by means of the adjusting means 24, respectively.

The reflectance and transmittance (R(A), T(A)) of the partial reflection and transmission mirror 14A that is nearest to the optical resonator mirror 12 may be set to about 25% and about 75%, respectively. The reflectance and transmittance (R(B), T(B)) of the next partial reflection and transmission mirror 14B may be set to about 33% and about 67%, respectively. The reflectance and transmittance (R(C), T(C)) of the third partial reflection and transmission mirror 14C may be set to about 50% and about 50%, respectively. The reflectance and transmittance (R(D), T(D)) of the fourth partial reflection and transmission mirror 14D may be set to about 0% and about 100%, respectively.

With the above settings as to the respective reflectances and transmittances (R , T), the partial reflection and transmission mirrors 14A to 14D will effect the following reflections and transmissions.

The primary laser beam $LB_0$ is projected upon the first partial reflection and transmission mirror 14A which reflects about 25% of the incident primary laser beam $LB_0$ (about 0.25 $LB_0$) while transmitting the remaining part or about 75% of the incident primary laser beam $LB_0$ (about 0.75 $LB_0$).

The laser beam transmitted from the first mirror 14A is then directed to the second partial reflection and transmission mirror 14B which in turn reflects about 33% of the laser beam incident thereon (or about 0.25 $LB_0$) while transmitting the remaining part or about 67% of the laser beam incident thereon (or about 0.50 $LB_0$).

The laser beam (about 0.50 $LB_0$) transmitted from the second mirror 14B is directed to the third partial reflection and transmission mirror 14C which in turn reflects 50% of the laser beam incident thereon while transmitting the remaining part or about 50% of the laser beam incident thereon (or about 0.25 $LB_0$).

The laser beam (about 0.25 $LB_0$) transmitted from the third mirror 14C is directed to the fourth partial reflection and transmission mirror 14D which functions as a total reflection mirror to reflect the whole of the laser beam incident thereon.

In this manner, with the four partial reflection and transmission mirrors 14A, 14B, 14C and 14D, four deflected laser beams having a uniform laser output are obtained as split laser beams LB(A), LB(B), LB(C) and LB(D).

Then the split laser beams LB(A) to LB(D) simultanously enter the input units 18A to 18D in which the split laser beams LB(A) to LB(D) pass through focusing lenses (not shown) to be projected in focus upon one end faces of the optical fibers 104A to 104D, respectively.

After passing through the optical fibers 104A to 104D, the split laser beams LB(A) to LB(D) are recieved by the output units 102A to 102D, respectively. The output units 102A to 102D emit in focus the split laser beams LB(A) to LB(D) to the corresponding workpieces W to be welded, repectively.

The shutters 16A to 16D serve to selectively or independently control transmission of the split laser beams LB(A) to LB(D) when the occasion demands, allowing multi-branch in time difference. As long as each shutter 16 is open, the split laser beam LB passes therethrough without being subjected to attenuation.

As described above, since the reflectance and transmittance (R, T) of the mirrors 14A to 14D can be adjusted to any desired value, the laser beam-splitting apparatus of the embodiment can easily solve problems such as variations in the refelection and transmission properties of the mirrors and variations in the component of polarization of laser beam of the mirrors, and it can precisely split the laser output of the primary laser beam $LB_0$ into equal parts to produce a uniform processing result and to improve the reliability of the multi-position processing system. In addition, because an attenuator is not used, the apparatus can avoid wastful loss of the laser power of the laser beam and improve the efficiency of laser energy.

Figure 9:
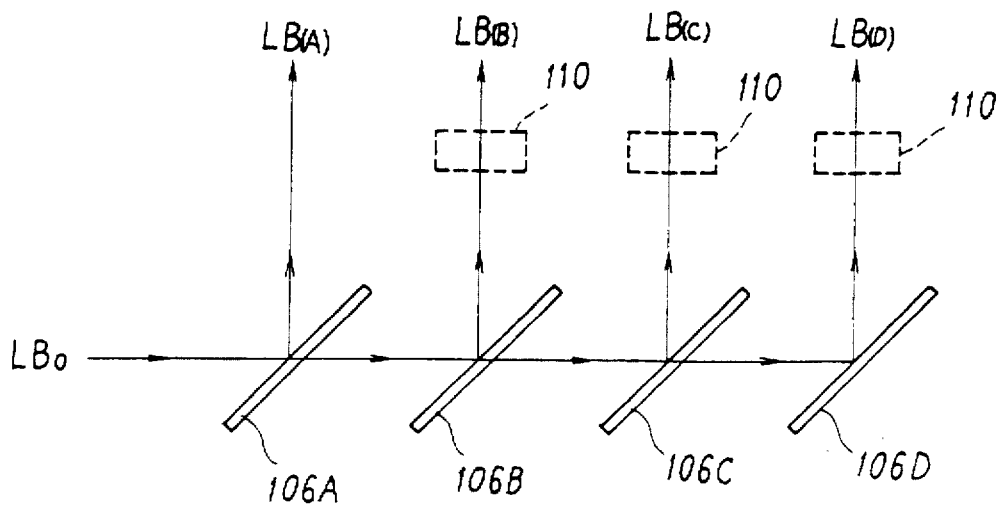
FIG. 9 is a perspective view showing an arrangement of a prior art laser beam-splitting apparatus.
Figure 10:
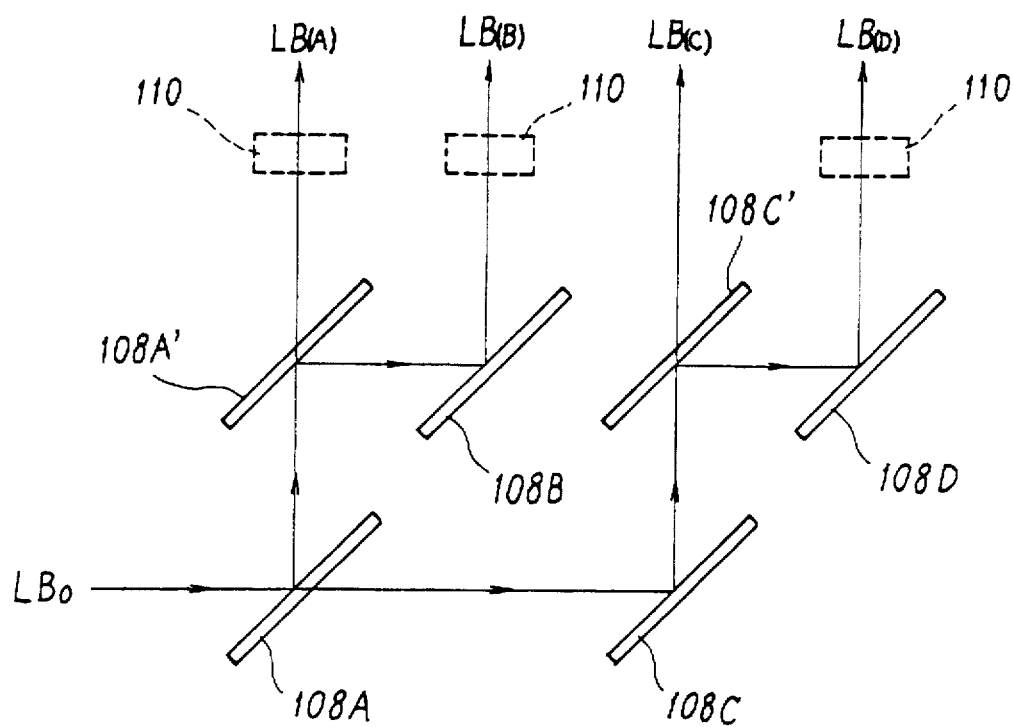
FIG. 10 is a perspective view showing an arrangement of another prior art laser beam-splitting apparatus.

The superiority of the appatatus of the invention compared to the prior art apparatus of FIGS. 9 or 10 with respect to the efficiency of laser energy and variations of the required laser energy will now be described with reference to FIGS. 6 and 7.

Figure 6:
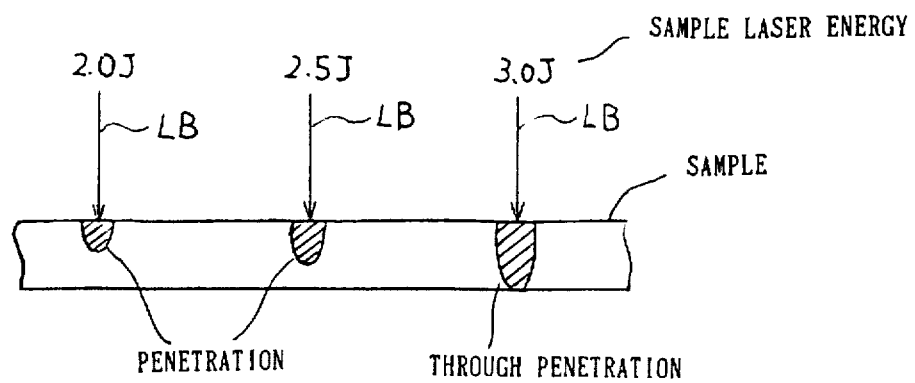
FIG. 6 is a perspective view showing a method of testing or observation for comparing the invention with the prior art with respect to efficiency of laser energy.

FIG. 6 shows a method of testing or observation for comparing the invention with the prior art, in which a split laser beam LB is applied to a sample, for example, a plate of stainless-steel SUS 304 having a thickness of a millimeter. The higher the laser power of the split laser beam LB is, the more deeply a penetration is formed in the sample by the energy of the laser. It is observed whether the penetration has reached the back of the sample or not.

Figure 7:
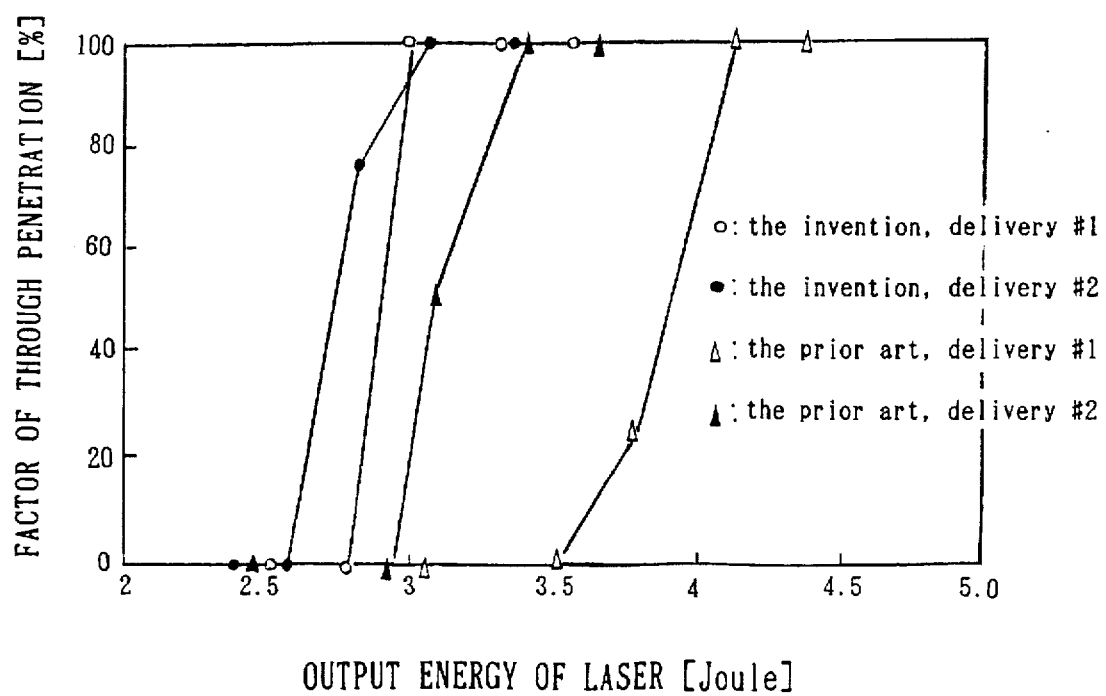
FIG. 7 is a diagram showing an example of results in the test of FIG. 6.

FIG. 7 is a diagram showing an example of the results of the observation, in which the abscissas represents the output energy of a split laser beam whereas the ordinate represents the factor of through penetration with the laser beam, namely the ratio of the number of the samples in which a penetration has been formed therethrough by the laser energy of the split laser beam to the the number of all samples (i.e. one hundred) to which the split laser beam has been applied.

According to the invention, the factor of through penetration on delivery #1 is surely 100% with an output energy of laser higher than about 3.0 Joules though being 0% with an output energy of laser lower than about 2.77 Joules; and on delivery #2, 100% with about 3.04 Joules though being 0% with up to 2.6 Joules and being 75% with about 2.8 Joules.

On the other hand, in the prior art, the factor of through penetration on delivery #1 is still 0% with 3.5 Joules of an output energy of laser, exhibits about 25% with 3.8 Joules of an output energy of laser and reaches 100% with 4.1 Joules of an output energy of laser; and on delivery #2, still 0% with 2.9 Joules, 50% with about 3.12 Joules and 100% with about 3.36 Joules.

It is understood from FIG. 7 that the apparatus of the invention requires less output energy of laser for a split laser beam to produce a sufficient penetration in a workpiece than with the prior art apparatus, and, in addition, the laser beams of the apparatus of this invention vary far less than those of the prior art apparatus.

Furthermore, because of using no attenuation plate, the invention can not only reduce the cost but also avoid an interference of light, which may cause a lack of uniformity in beam profiles of split laser beams, thereby leading to a uniform processing (welding) quality.

In the present embodiment, the laser beam-splitting apparatus utilizes the same type of partial reflection and transmission mirrors 14A to 14D and it is therefore also advantageous with respect to production, stock management and maintenance cost.

However, it is noted that in the power-sharing deliveries described above, the reflectance and transmittance (R, T) of each of the partial reflection and transmission mirrors 14A to 14D are definitely known with respect to the position of the mirrors.

Accordingly, it is also desirable to select the range (Rmax, Tmin)–(Rmin, Tmax) of the variable reflectance and transmittance (R, T) in each mirror 14 to a narrower range including the preselected values so as to improve the resolution of the reflectance and transmittance (R, T), thus permitting more fine adjustment.

In the four-deliveries as described above, for instance, the range of variable reflectance and transmittance, (Rmax, Tmin)–(Rmin, Tmax), may be selected to (about 30%, about 70%)–(about 20%, about 80%) for the first mirror 14A, (about 28%, about 72%)–(about 38%, about 62%) for the second mirror 14B and (about 45%, about 55%)–(about 55%, about 45%) for the third mirror 14C.

The fourth mirror 14D may be replaced by an ordinary total reflection mirror. Alternately, the fourth mirror 14D may be omitted by positioning the fourth input unit 18D behind the third partial reflection and transmission mirror 14C. In this case, the laser beam transmitted from the mirror 14C enters the input unit 18D as the fourth split laser beam LB(D).

Besides four power-sharing deliveries as described above, three or any other multi-power-sharing deliveries can be effected in accordance with the invention. Furthermore, the laser outputs of the split laser beams LB(A) to LB(D) may be set to desired values independently of one another by individually adjusting the reflectance and transmittance (R, T) of the mirrors 14A to 14D.

The shape or configuration of a partial reflection and transmission mirror 14 for use in the invention is not restricted to that shown in FIG. 2 but may be variously modified.

Figure 5:
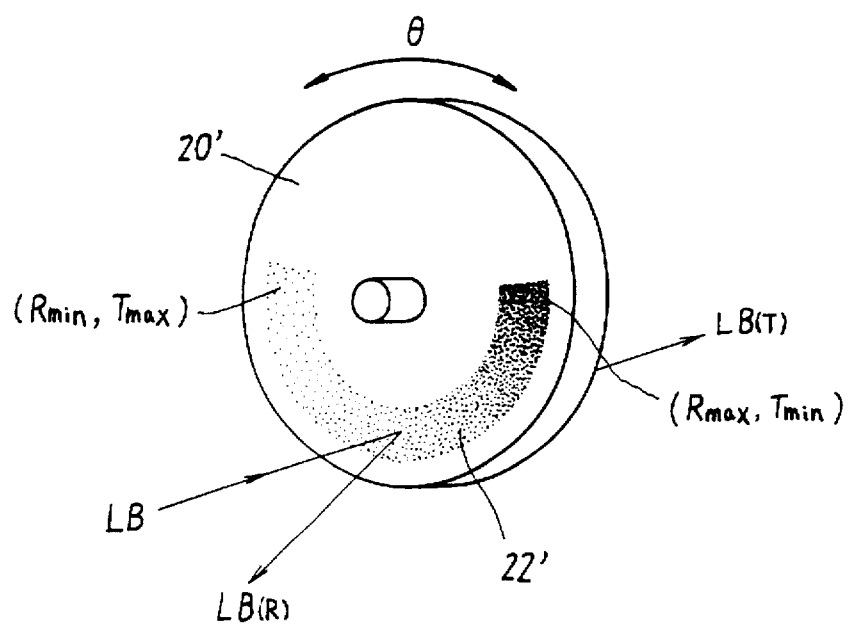
FIG. 5 is a perspective view of a partial reflection and transmission mirror in a modified embodiment of the invention.

For example, as shown in FIG. 5, a disc-shaped partial reflection and transmission mirror can be used, too. In this modification, a disc-shaped mirror plate 20' has its surface or reverse coated with a partial reflection and transmission multilayer film 22' with a reflectance (R) and transmittance (T) that spatially and continuously varies in the circumferential direction of the mirror plate 20' as indicated by the arrow θ within the range of (Rmax, Tmin) to (Rmin, Tmax) for the wave length of the laser beam concerned. In this configuration, adjusting means (not shown) is adapted to turn the disc-shaped mirror plate 20' to shift its position in the circumferential direction.

Although particular embodiments of the invention have been shown and described, alteration and modifications thereof can be made by a person having an ordinary skill in the art without departing from the scope of the present invention as defined by the accompanying claims.

What is claimed is:

1. A laser beam-splitting apparatus for producing a plurality of split laser beams from a primary laser beam, said apparatus comprising:

one or a plurality of partial reflection and transmission mirrors, each of said mirrors having a reflectance and transmittance to the wave length of said primary laser beam continuously varying in one-dimensional or two-dimensional directions on the mirror surface and each of said mirrors being disposed on the optical axis of the laser beam, wherein the laser beams reflected or transmitted from said reflection and transmission mirrors are output as the split laser beams, respectively;

mirror support means for supporting said partial reflection and transmission mirrors across said optical axis of said laser beam;

adjusting means for adjusting a position of each said partial reflection and transmission mirrors so as to obtain a desired reflectance and transmittance; and fixing means for fixing said mirror support means at the position at which the desired reflectance and transmittance are obtained.

2. The laser beam-splitting apparatus as claimed in claim 1, wherein each of said partial reflection and transmission mirrors comprises:

a mirror plate formed of a transparent material; and a partial reflection and transmission film coated on at least one surface of said mirror plate, said partial reflection and transmission film having a reflectance and transmittance to the wave length of said primary laser beam which continuously varies along a longitudinal direction of said mirror plate.

3. The laser beam-splitting apparatus as claimed in claim 1, wherein said adjusting means comprises:

shifting means for shifting the position of said mirror support means so as to vary said reflectance and transmittance of said partial reflection and transmission mirrors.

4. The laser beam-splitting apparatus as claimed in claim 1, wherein said adjusting means comprises:

rotating means for rotating the position of said mirror support means so as to vary said reflectance and transmittance of said partial reflection and transmission mirrors.

5. A laser beam-splitting apparatus for producing a plurality of split laser beams from a primary laser beam, said apparatus comprising:

a horizontal base plate;

a vertical support plate movably mounted on said horizontal base plate; and a partial reflection and transmission mirror supported on said vertical support plate, said partial reflection and transmission mirror having a reflectance and transmittance to the wave length of the primary laser beam, wherein said reflectance and transmittance of said partial reflection and transmission mirror is continuously variable in one-dimensional or two-dimensional directions along a surface of the mirror.

6. The laser beam-splitting apparatus as claimed in claim 5, wherein said partial reflection and transmission mirror comprises:

a mirror plate formed of a transparent material; and a partial reflection and transmission film coated on at least one surface of said mirror plate, said partial reflection and transmission film having a reflectance and transmittance to the wave length of said primary laser beam which continuously varies along a longitudinal direction of said mirror plate.

7. The laser beam-splitting apparatus as claimed in claim 5, further comprising a fixing device connected to said mirror support structure for fixing said vertical support plate in a desired position relative to said horizontal base plate.

8. The laser beam-splitting apparatus as claimed in claim 5, further comprising an adjusting device connected to said vertical support plate for effecting movement of said vertical support plate relative to said horizontal base plate.

9. A multi-position processing system for processing a plurality of workpieces at different processing positions with a plurality of split laser beams, respectively, said system comprising:

laser oscillation means for producing a primary laser beam;

a plurality of partial reflection and transmission mirrors each having a reflectance and transmittance to the wave length of the primary laser beam, said reflectance and transmittance continuously varying in one-dimensional or two-dimensional directions along a mirror surface, and each of said partial reflection and transmission mirrors being disposed on the optical axis of the laser beam, wherein the laser beams reflected or transmitted from said reflection and transmission mirrors are output as the split laser beams, respectively; adjusting means for adjusting the position of each of said partial reflection and transmission mirrors so as to obtain a desired reflectance and transmittance;

optical fibers for transmitting the split laser beams to the different processing positions, respectively;

input means for projecting the split laser beams, from said partial reflection and transmission mirrors, upon first ends of said optical fibers, respectively; and output means disposed near the processing positions for receiving the split laser beams transmitted via said optical fibers for projecting the received split laser beams to the workpieces, respectively.

\* \* \* \* \*